United States Patent [19]

Chowdhury

[11] 4,350,599

[45] Sep. 21, 1982

[54] PROCESS FOR TREATMENT OF CAUSTIC WASTE LIQUORS

[75] Inventor: Ajit K. Chowdhury, Schofield, Wis.

[73] Assignee: Sterling Drug Inc., New York, N.Y.

[21] Appl. No.: 220,443

[22] Filed: Dec. 29, 1980

[51] Int. Cl.$^3$ ............................................... C02F 1/72
[52] U.S. Cl. ................................ 210/761; 423/206 R; 162/31
[58] Field of Search .................. 162/31; 210/761, 762; 423/206 R

[56] References Cited

U.S. PATENT DOCUMENTS

| | | |
|---|---|---|
| 3,097,988 | 7/1963 | Schoeffel. |
| 3,714,911 | 2/1973 | Pradt. |
| 3,944,462 | 3/1976 | Hess et al. ............................ 162/31 |
| 4,067,767 | 1/1978 | Hess et al. ............................ 162/31 |
| 4,124,505 | 11/1978 | Horak et al. ........................ 210/762 |

FOREIGN PATENT DOCUMENTS 47-44956 11/1972 Japan ................................ 210/761
52-16868 2/1977 Japan.

OTHER PUBLICATIONS

A. K. Chowdhury and A. R. Wilhelmi, Treatment of Spent Caustic Liquors by Wet Oxidation, 8th Annual Ind. Poll. Conference of Water & Wastewater Equip. Mfrs. Assn., Jun. 3–6, 1980, Houston, TX.

*Primary Examiner*—William F. Smith
*Attorney, Agent, or Firm*—Allen H. Erickson; Thomas L. Johnson; B. Woodrow Wyatt

[57] ABSTRACT

An improvement in the wet oxidation of caustic waste liquors wherein carbon dioxide produced in the wet oxidation is recycled to raw caustic waste to neutralize the latter, thereby reducing the corrosive nature of the waste.

13 Claims, 2 Drawing Figures

PROCESS FOR TREATMENT OF CAUSTIC WASTE LIQUORS

BACKGROUND OF THE INVENTION

Spent caustic liquors are generated in chemicals and petrochemicals manufacturing operations and are characterized by high pH (about 13.0). The spent caustic liquors contain organic substances and strong bases, usually sodium hydroxide, and often contain sulfides. The caustic wastes can be treated effectively by wet oxidation for almost complete destruction of the pollutants, whereby sulfides are oxidized to sulfates and the organic substances are primarily converted to carbon dioxide and water.

Such wet oxidation processes are shown for example in Schoeffel U.S. Pat. No. 3,097,988 and Pradt U.S. Pat. No. 3,714,911, which disclose methods of treating alkaline pulping black liquors by wet oxidation.

A summary of the state of the art has been presented by A. K. Chowdhury and A. R. Wilhelmi in a paper entitled "Treatment of Spent Caustic Liquors by Wet Oxidation", presented at the 8th Annual Industrial Pollution Conference sponsored by Water and Wastewater Equipment Manufacturers Association, June 3-6, 1980, Houston, Texas.

The wet oxidation of the caustic wastes is usually carried out in the temperature range of 350°-650° F., and at a pressure in the range of 300-3500 psi. To achieve the desired reaction temperature, particularly at the higher end of the temperature range, the feed often requires preheating almost up to the reaction temperature. Feed preheating is usually achieved by exchanging heat between the feed and the effluent in a heat exchanger followed by supplemental heating by a "hot oil" heater.

The high preheat and reaction temperatures, often necessary for the treatment of caustic wastes, require special materials of construction of the wet oxidation system components to prevent corrosion. High nickel alloys such as Incoloy 800 are resistant to alkali at higher temperatures but are expensive. Also, when the wet oxidation system components are made of Incoloy 800, preheating of the feed must be performed in presence of oxygen because of high corrosion rates under oxygen-deficient conditions. To avoid oxygen-deficient conditions in the feed preheaters, the oxidizing gas must be added to the feed before the preheaters. This can be done only when the oxidizing gas is air and when the caustic waste does not contain easily oxidizable matter such as sulfides. For wastes containing sulfides, if air is added before the preheaters, a substantial portion of the oxidation would occur in the feed preheaters which will upset the energy balance in the wet oxidation reactor. On the other hand, if the oxidizing gas is pure oxygen, addition of the gas before the oil heater will result in unsafe operating conditions, with a risk of fire or explosion.

It has been observed that the severity of corrosion by the caustic wastes is reduced significantly when the pH is adjusted to below about 11.0, thereby permitting the wet oxidation components to be constructed of stainless steel which will result in substantial reduction in capital costs for the system. The feed pH can be lowered by adding an acid such as sulfuric acid. However, the operating cost for the treatment process will be high because of high chemical cost. Also, addition of sulfuric acid for pH adjustment will significantly increase the dissolved solids content of the waste which is undesirable.

The addition of various anti-corrosion chemical agents to liquids (e.g., boiler feedwater) is well known. Kitayama et al Japanese Patent Publication No. 52-16868 (Feb. 8, 1977) discloses the treatment of liquors which become highly acidic in the wet oxidation process and thus corrode the titanium equipment. Nitric acid, nitrous acid, chromic acid, or permanganic acid and one or more of the sodium, potassium or ammonium salts of those acids are added to the liquid prior to wet oxidation in order to form and/or maintain a protective oxidation film on the titanium equipment.

SUMMARY OF THE INVENTION

The invention relates to a continuous process for the treatment of a caustic waste by wet oxidation comprising the steps of:

a. adjusting the pH of a portion of the raw waste to below 11.0 by contacting said waste with an acid or carbon dioxide;

b. oxidizing the neutralized waste obtained in step (a) with an oxygen-containing gas in a wet oxidation reactor to produce a gas stream rich in carbon dioxide;

c. cooling the hot reactor effluents and separating the oxidized liquor from the noncondensible gases containing carbon dioxide;

d. contacting said noncondensible gases with additional incoming raw caustic waste to neutralize said waste with the carbon dioxide content of said gases; and e. continuously repeating steps b, c and d in a cyclic process.

DETAILED DESCRIPTION INCLUSIVE OF PREFERRED EMBODIMENTS

In order to initiate the continuous process of the invention, a portion of caustic waste liquor sufficient to start up the wet oxidation reaction is treated with an acid or with carbon dioxide from an external source to lower the pH of the liquor to below 11.0. If an acid is used, any acid can be employed, although mineral acids such as sulfuric, phosphoric or nitric acids are preferred, and the pH is preferably not reduced below 7. If carbon dioxide is used, whether in the gaseous, liquid or solid state, it is preferably added until the waste liquor is saturated and the pH will still be on the alkaline side in view of the alkali metal carbonate content of the solution.

The carbon dioxide whether from an external source or by recycle from the wet oxidation reactor is contacted with the raw caustic waste in an absorber maintained at ambient temperature or above, preferably in the range of 70°-200° F.

The wet oxidation system which can be constructed of inexpensive stainless steel is operated in a range of 350°-650° F. and a pressure in a range of 300-3500 psi. The oxygen-containing gas can be ordinary air, air enriched with oxygen, or pure oxygen. In the event pure oxygen or air enriched with oxygen is used, precautions must be taken to avoid untoward reactions such as fire or explosion. The recycled carbon dioxide serves a dual purpose of neutralizing the raw waste and diluting the oxygen to safe concentration levels. In the event that further dilution of the oxygen in the system is required, an inert gas such as nitrogen can be injected as needed.

In the event the organic content of the raw waste is insufficient to provide enough carbon dioxide by wet oxidation to neutralize additional incoming raw waste, supplementary carbon dioxide can be added from an external source, or a modification of the invention can be used whereby the neutralized raw waste is fortified with a carbonaceous material capable of producing carbon dioxide upon wet oxidation in quantities sufficient to compensate any deficit between the carbon dioxide produced by wet oxidation of the organic content of the original raw waste and the carbon dioxide necessary to neutralize the strong bases in the raw waste. Exemplary of carbonaceous materials that can be used are various forms of elementary carbon such as coal, coke, peat, lignite and charcoal; petroleum and petroleum products; municipal and industrial sludges; and cellulosic materials. The carbonaceous material can be added to the neutralized raw waste prior to preheating for wet oxidation, or directly into the wet oxidation reactor.

Figure 1:
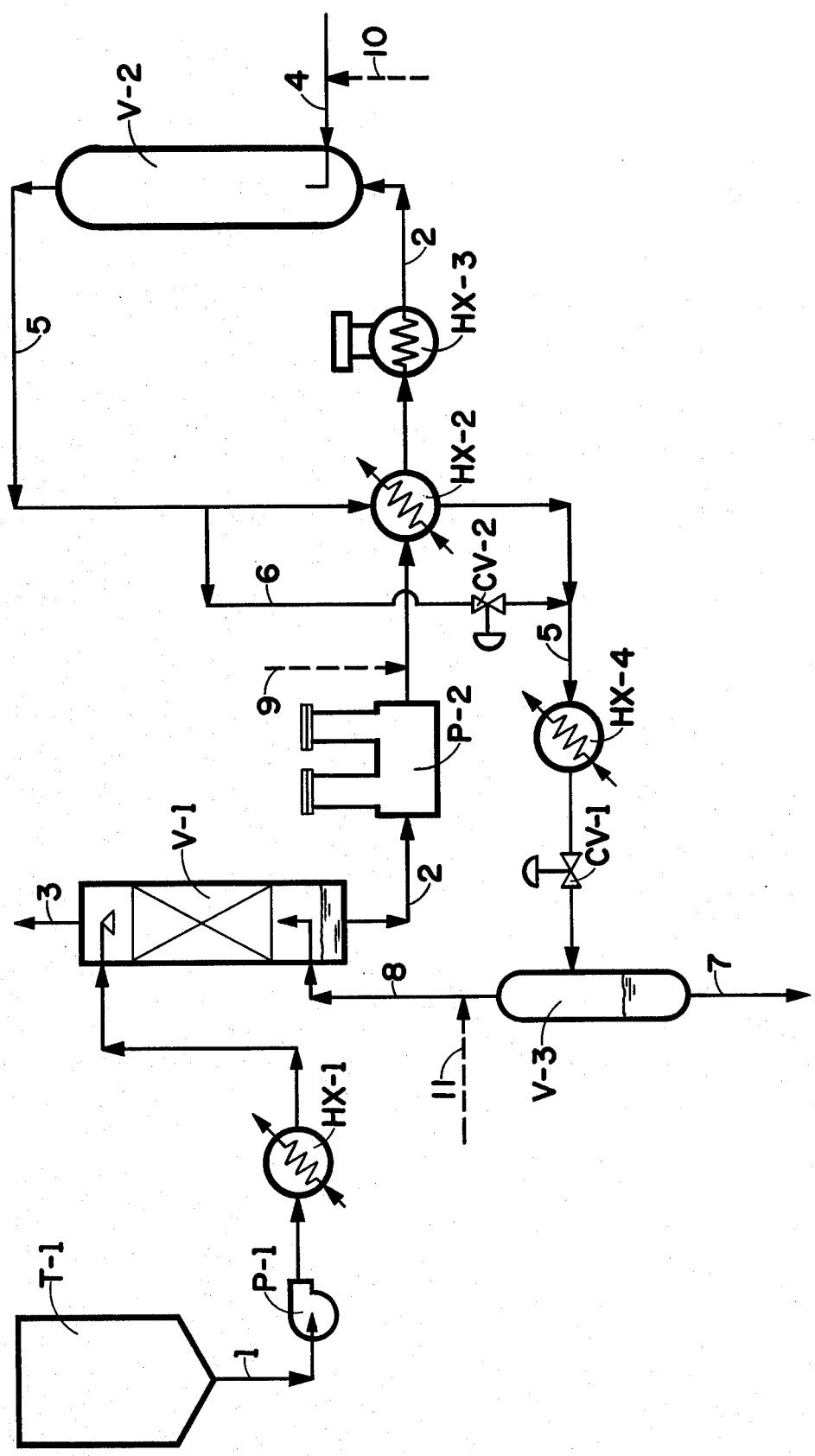
FIG. 1 is a flow diagram of the invention.

The present invention is further illustrated in the drawings. In FIG. 1 the caustic waste from tank T-1 is pumped via line 1 through the heat exchanger HX-1 and is discharged into the top of the carbon dioxide absorber V-1. The raw waste is preheated by indirect steam in heat exchanger HX-1. In the absorber the waste is contacted with carbon dioxide entering at the bottom of the absorber via line 8 and flowing countercurrent to the waste. The absorber can be of any known design such as a packed tower or a plate column capable of providing good gas-liquid contact.

The free base in the raw waste reacts with the carbon dioxide in the absorber V-1 to form soluble carbonates and the liquor pH is lowered to less than 11.0. The preferred conditions for the operation of the absorber are 70°–200° F.

The treated raw waste from absorber V-1 via line 2 is pumped by a high pressure pump P-2 through the heat exchangers HX-2 and HX-3 into the bottom of the reactor V-2. The raw waste is preheated in HX-2 by the hot reactor effluent while the heat exchanger HX-3 provides any supplemental heat necessary to further preheat the feed to achieve the desired reaction temperature. The heat exchanger HX-3 operates on the heating mediums such as THERMINOL or DOWTHERM and can be of any known design capable of providing heat at the desired temperature ranges.

An oxidizing gas, e.g. air, is introduced into the bottom of reactor V-2 via line 4. The hot effluent from the top of reactor V-2 via line 5 first exchanges heat with the incoming waste in the heat exchanger HX-2, is cooled in the product cooler HX-4 and discharged into the gas-liquid separator V-3 after pressure letdown through the control valve CV-1. The preheat temperature of the influent waste at HX-2 discharge can be controlled by using the bypass line 6 and control valve CV-2 around the heat exchanger HX-2.

The oxidized liquor and the noncondensible gases are separated in the gas-liquid separator V-3. The oxidized liquor is discharged via line 7 and the gases from the top of the separator V-3 flows into the absorber V-1 via line 8. The noncondensible gases contain carbon dioxide along with inerts and unreacted oxygen. Any excess carbon dioxide along with the inert gases is discharged from the top of the absorber via line 3 and is disposed of.

In the wet oxidation reactor all sulfur forms are oxidized to sulfate and the organics are primarily converted to carbon dioxide and water. During oxidation some low molecular weight fatty acids such as acetic acid and formic acid are also produced which usually results in a lowering of the pH of the reactor effluent. This ensures a pH of lower than 11.0 in the entire wet oxidation system and hence all the components in the unit exposed to high temperatures can be constructed of stainless steel.

The conditions for wet oxidation vary significantly depending on the type and source of the caustic waste and the treatment objectives. The preferred conditions for wet oxidation are 350°–650° F. and 300°–3500° psi.

Since the raw waste is saturated with carbon dioxide, the carbon dioxide generated by the oxidation of the organics in the wet oxidation reactor will be present in the gas. In the present invention, the gaseous carbon dioxide is absorbed by the incoming raw waste in the carbon dioxide absorber described earlier and is continuously recycled into the wet oxidation reactor.

When air is the oxidizing gas, nitrogen in the air provides continuous dilution so that the oxygen concentration is always within safe operating limits. With oxygen as the oxidizing gas, dilution of unreacted oxygen is provided by the circulating gaseous carbon dioxide, but may not always be adequate to lower the oxygen concentration in the vent gas to safe levels. In this event an inert gas must be introduced into the wet oxidation system to provide additional dilution. This is achieved by introducing nitrogen gas via line 9.

Additionally, with pure oxygen it is desirable to maintain a constant positive flow in the oxygen line into the reactor so that no combustible materials can enter or accumulate in the oxygen line. This is achieved by providing a small continuous flow of water via line 10 into the oxygen flow via line 4.

Line 11 is provided to add carbon dioxide as needed from external sources into the absorber. The primary products of wet oxidation of organic materials are carbon dioxide and water and the organic content of a given caustic waste may not be high enough to produce adequate carbon dioxide to completely neutralize the raw waste. The carbon dioxide supply from external sources will compensate for any deficit between the carbon dioxide produced by wet oxidation of the organic content of the waste and the carbon dioxide necessary to lower the raw waste pH to less than 11.0 and hence maintain a continuous carbon dioxide recycle.

Figure 2:
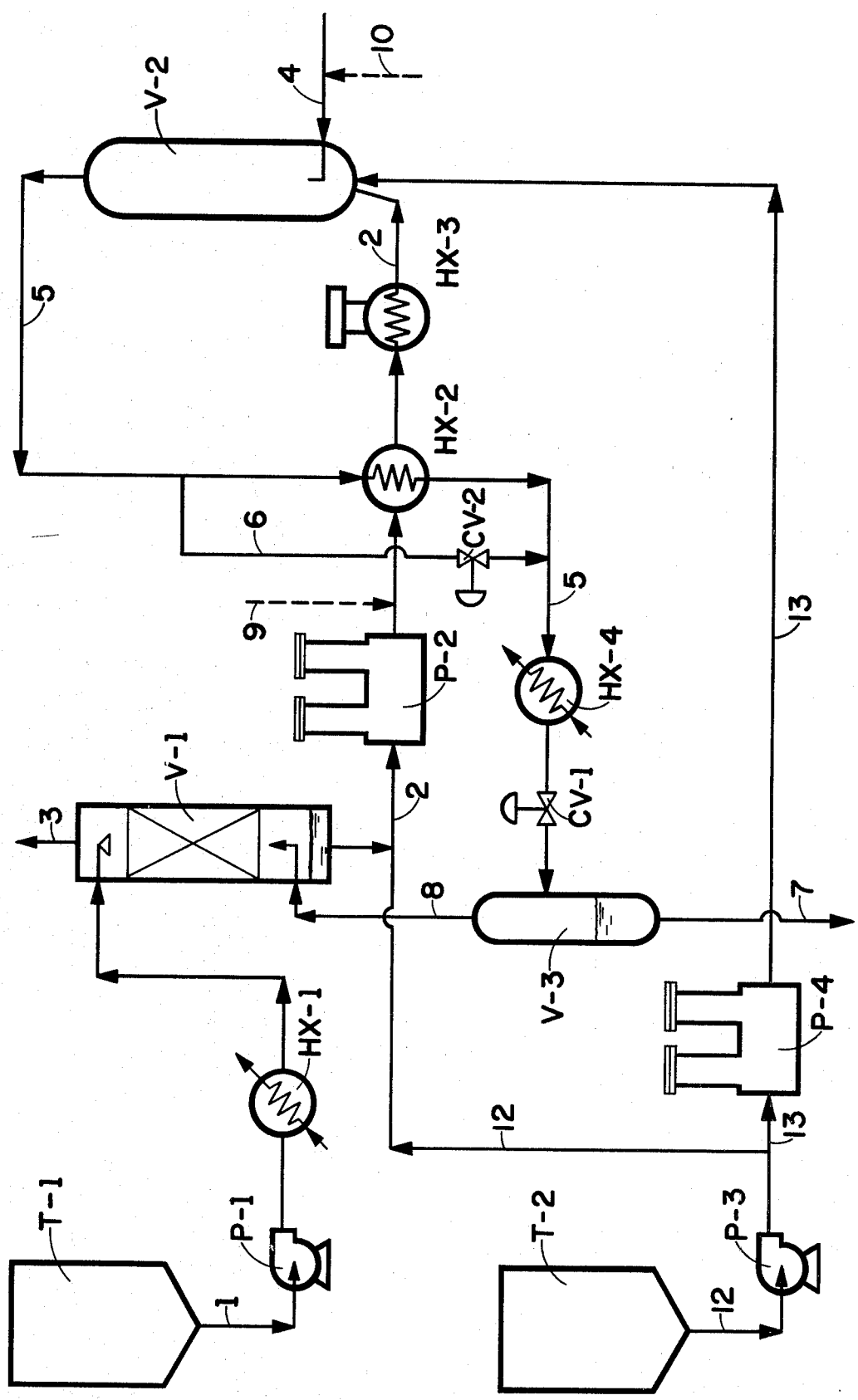
FIG. 2 is a flow diagram showing a modification of the invention wherein supplementary carbonaceous material is supplied as a source of additional carbon dioxide.

FIG. 2 shows modifications of the present invention wherein a carbonaceous organic material is supplied into the wet oxidation system as a source of carbon dioxide. The carbon dioxide generated by wet oxidation of the added organic material will compensate for any deficit between the carbon dioxide produced by wet oxidation of the organic content in the raw waste and the carbon dioxide necessary to neutralize the raw waste.

Referring to FIG. 2, organic matter from tank T-2 is pumped by pump P-2 via line 12 into the neutralized raw waste in line 2 at the suction of high pressure pump P-2. Alternatively, the organic matter may be pumped directly into the wet oxidation reactor V-2 by high pressure pump P-4 via line 13.

EXAMPLE 1

A spent caustic scrubbing liquor having the following approximate composition was obtained from a petrochemical plant:

| Raw Liquor Analysis | |
|---|---|
| pH | 12.4 |
| Sulfur, g/l | 5.8 |
| $CO_2$, g/l | 29.2 |
| Total Sodium, g/l | 54.3 |
| NaOH, g/l | 26.9 |

The liquor was treated by wet oxidation with and without prior pH adjustment with carbon dioxide.

The raw waste contained an immiscible organic layer having a higher Chemical Oxygen Demand (COD) than the aqueous phase. The COD of the liquor was varied by combining a fraction of the organic layer with the aqueous phase prior to pH adjustment. Incoloy 800 and type 316L stainless steel were tested as possible reactor materials of construction with the following results:

| | Test No. | | | | | | | |
|---|---|---|---|---|---|---|---|---|
| | 1 | 2 | 3 | 4 | 5 | 6 | 7 | 8 |
| Material Tested | 800 | SS | SS | SS | SS | SS | SS | SS |
| Pretreatment with $CO_2$ | 0 | 0 | 0 | + | 0 | 0 | + | + |
| pH After $CO_2$ Treatment | — | — | — | 10.0 | — | — | 10.0 | 10.8 |
| Raw Liquor COD, g/l | 20.7 | 20.7 | 49.8 | 20.7 | 20.7 | 49.8 | 20.7 | 49.8 |
| Oxidation Temp. °F. | 550 | 550 | 550 | 550 | 608 | 608 | 608 | 608 |
| Oxygen Supplied | Def. | Def. | Def. | Def. | XS | XS | XS | XS |
| Stress Corrosion Cracking | No | Yes | Yes | No | Yes | No | No | No |

An oxygen deficiency in tests 1–4 is indicated by "Def." and an excess of oxygen in the other tests is indicated by "XS".

The general corrosion rate was high (about 40 mils per year) for Incoloy 800 while with 316L S.S. the rate was only about 5 mils per year.

EXAMPLE 2

A specific example of the practice of the present invention is herewith set forth. The example illustrates treatment of a petrochemical plant caustic liquor having the following characteristics:

pH: 12.7
Chemical Oxygen Demand (COD): 20.0 g/l
Sulfide Sulfur: 7.5 g/l
NaOH, percent by weight: 3.0

The quantities given in the following material balance relate to a plant treating 12.5 gallons per minute (GPM) of raw liquor with the flowscheme of FIG. 2. The reactor and piping are constructed of type 316L stainless steel.

Referring now to FIG. 2, the raw caustic liquor from tank T-1 is pumped through line 1 to heat exchanger HX-1, where it is heated to 140° F., and discharged into the top of absorber V-1. The raw liquor is contacted with carbon dioxide in the absorber to lower the liquor pH to about 10.0.

The treated raw liquor at pH 10.0 is pumped by high pressure pump P-2 through heat exchangers HX-2 and HX-3 into wet oxidation reactor V-2. The liquor is heated to about 496° F. in HX-2 by indirect heat exchange with hot reactor effluent 5. The liquor enters the reactor at 496° F. Heat exchanger HX-3 is used only for startup in this particular example, because the liquor COD is sufficient to maintain a favorable heat balance.

Waste oil 13 from the petrochemical plant, having a COD of 3.56 grams oxygen per gram oil, is introduced separately into the reactor at a rate of 42 pounds per hour. The effective COD of combined liquor 2 and waste oil 13 entering the reactor is about 45 g/l.

Pure oxygen is introduced into the reactor at a rate of 286 pounds per hour via line 4 together with 123 pounds per hour of purge water 10.

Wet oxidation at 608° F. and 1900 psig in reactor V-2 results in about 95 percent reduction in COD.

The hot effluent 5 from the top of reactor V-2 is cooled in heat exchanger HX-2, further cooled in product cooler HX-4, and discharged into separator V-3 at about 164° F. through pressure control valve CV-1. In this example, about 25 percent of the hot reactor effluent is bypassed through line 6 and control valve CV-2 in order to maintain the temperature of raw liquor entering reactor V-2 at 496° F.

The cooled oxidized liquor from separator V-3 is discharged to disposal via line 7, while about 200 pounds per hour of non-condensible gas rich in carbon dioxide flows into absorber via line 8. A major portion of the carbon dioxide in the gas entering the absorber is absorbed by the influent caustic liquor. Excess carbon dioxide containing about 26 percent oxygen by volume is discharged from the top of the absorber via line 3. The raw liquor pH is thus adjusted to about 10.0.

I claim:

1. A continuous process for the treatment of a caustic waste by wet oxidation in a stainless steel system, comprising the steps of:
   a. initially adjusting the pH of a portion of the raw waste to below 11.0 but above 7.0 by contacting said waste with an acid or carbon dioxide;
   b. oxidizing the neutralized waste obtained in step (a) with pure oxygen or air enriched with oxygen in a wet oxidation reactor to produce a gas stream rich in carbon dioxide;
   c. cooling the hot reactor effluents and separating the oxidized liquor from the noncondensible gases containing carbon dioxide;
   d. contacting said noncondensible gases with additional incoming raw caustic waste to neutralize said waste with the carbon dioxide content of said gases; and
   e. continuously repeating steps b, c and d in a cyclic process.

2. Process according to claim 1 wherein the initial pH adjustment of the raw waste in step (a) is effected by the addition of a mineral acid selected from the group consisting of sulfuric acid, phosphoric acid and nitric acid.

3. A process according to claim 1 wherein the initial pH adjustment of the raw waste in step (a) is effected by the addition of gaseous carbon dioxide.

4. A process according to claim 1 wherein carbon dioxide is contacted with the raw waste in an absorber maintained at 70°–200° F.

5. A process according to claim 1 wherein the wet oxidation of the waste is carried out at 350°–650° F. and 300–3500 psi.

6. A process according to claim 1 wherein carbon dioxide is added from an external source to compensate for any deficit between the carbon dioxide produced by wet oxidation of the organic content of the waste and the carbon dioxide necessary to neutralize all of the strong base in the raw waste and thereby maintain a constant carbon dioxide recycle.

7. A process according to claim 1 wherein the oxidizing gas is substantially pure oxygen to produce a noncondensible gas of substantially pure carbon dioxide.

8. A process according to claim 7 wherein a small flow of water is maintained in the oxygen inlet line to the reactor to ensure a continuous positive flow.

9. A process according to claim 7 wherein high pressure nitrogen is added to the wet oxidation system as a diluent for the unreacted oxygen.

10. A process according to claim 1 wherein the neutralized raw waste is fortified with a carbonaceous material capable of producing carbon dioxide upon wet oxidation in quantities sufficient to compensate any deficit between the carbon dioxide produced by wet oxidation of the organic content of the original raw waste and the carbon dioxide necessary to neutralize all strong bases in the raw waste and thereby maintain a continuous carbon dioxide recycle.

11. A process according to claim 10 wherein the carbonaceous material is oil, coal, coke, peat, lignite, charcoal, petroleum products, municipal and industrial sludges or cellulosic materials.

12. A process according to claim 10 wherein the carbonaceous material is added to the neutralized raw waste prior to preheating the waste for wet oxidation.

13. A process according to claim 10 wherein the carbonaceous material is added directly into the wet oxidation reactor.

* * * * *